a12) United States Patent
Lelic

(10) Patent No.: US 6,900,934 B2
(45) Date of Patent: May 31, 2005

(54) INVERSION LEVEL CONTROLLER AND SYSTEM FOR OPTICAL AMPLIFIERS

(75) Inventor: Muhidin Lelic, Horseheads, NY (US)

(73) Assignee: Avanex Corporation, Fremont, CA (US)

( * ) Notice: Subject to any disclaimer, the term of this patent is extended or adjusted under 35 U.S.C. 154(b) by 402 days.

(21) Appl. No.: 10/260,678

(22) Filed: Sep. 27, 2002

(65) Prior Publication Data

US 2004/0061929 A1 Apr. 1, 2004

(51) Int. Cl.[7] .............................................. H04B 10/12
(52) U.S. Cl. .............................. 359/341.41; 359/337.12
(58) Field of Search ........................ 359/341.41, 341.42

(56) References Cited

U.S. PATENT DOCUMENTS

| 5,923,462 | A  | * | 7/1999 | van der Plaats | .......... | 359/341.3 |
| 6,016,218 | A  | * | 1/2000 | Jo et al. | ................. | 359/341.33 |
| 6,366,393 | B1 | * | 4/2002 | Feulner et al. | .............. | 359/337 |
| 6,381,560 | B1 | * | 4/2002 | Shah et al. | ...................... | 703/2 |
| 6,687,049 | B1 | * | 2/2004 | Sulhoff et al. | ........... | 359/341.4 |

OTHER PUBLICATIONS

Sun, Y., Zyskind, J.L., Srivastava, A.K., "Average Inversion Level, Modeling, and Physics of Erbium–Doped Fiber Amplifiers" IEEE Journal of Selected Topics in Quantum Electronics, vol. 3, No. 4, Aug. 1997, p. 991–1007.

* cited by examiner

Primary Examiner—Thomas H. Tarcza
Assistant Examiner—Eric Bolda
(74) Attorney, Agent, or Firm—Moser, Patterson & Sheridan, L.L.P.

(57) ABSTRACT

A control system and method for a multi-channel optical amplifier is provided that achieves and automatically maintains a selected gain level by controlling the average inversion level of the dopant atoms in the gain fiber. In both the system and the method, a set point average inversion level that corresponds to a gain set point is first selected. A pump light power output necessary to achieve the set point average inversion level is determined from the optical input power, output power, and pump light remnant power. The same parameters used to achieve and maintain the set point average inversion level are also used to determine linear gain per channel which in turn may be used to minimize tilt or ripple in the gain output of the amplifier.

42 Claims, 11 Drawing Sheets

Input signals

Output signals, no control

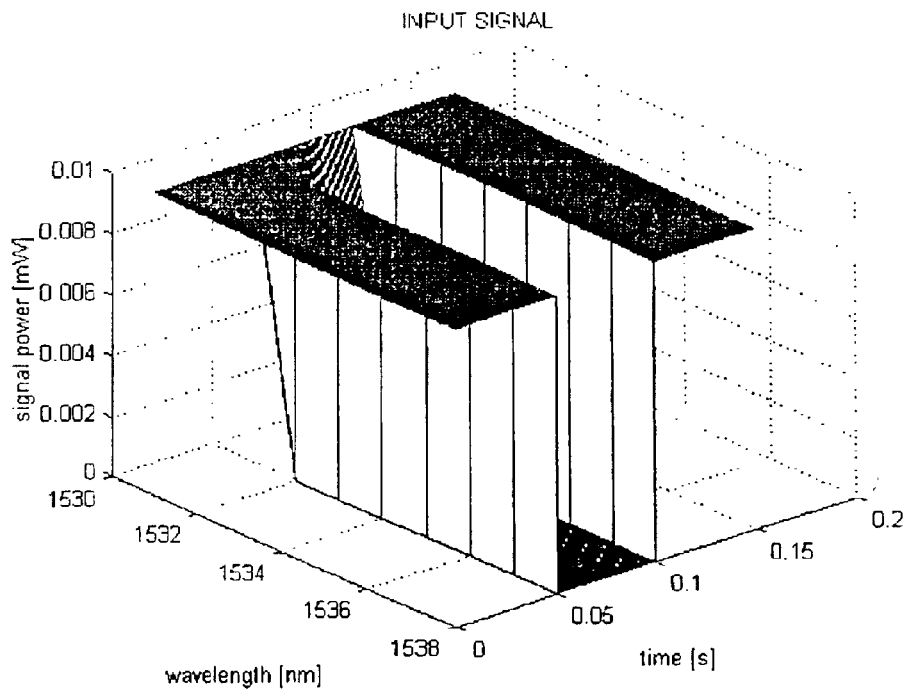
Figure 13
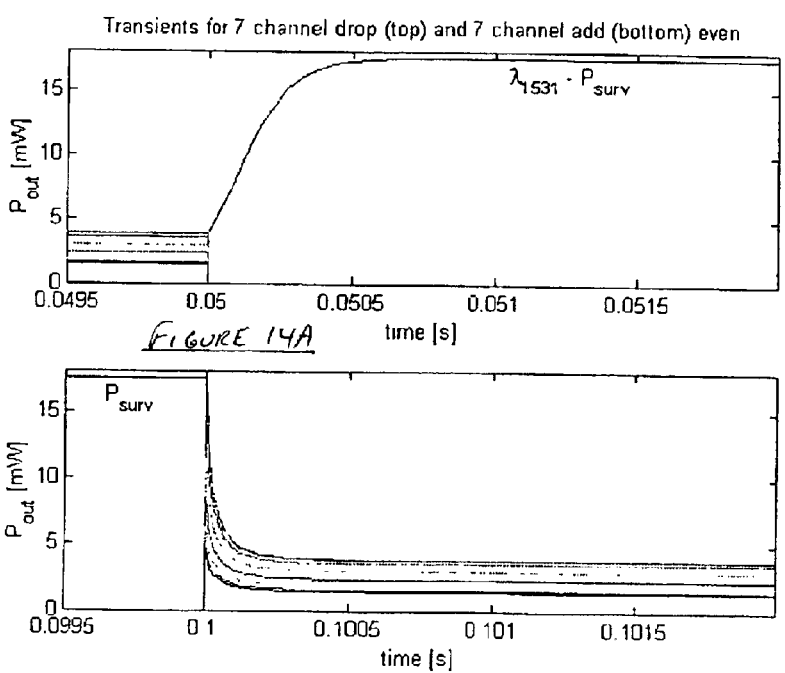
Figure 14A
Figure 14B

INVERSION LEVEL CONTROLLER AND SYSTEM FOR OPTICAL AMPLIFIERS

BACKGROUND OF THE INVENTION

This invention generally relates to control systems and methods for optical amplifiers, and is specifically concerned with a controller for a multi-channel optical amplifier that achieves and automatically maintains a selected gain level by controlling the average inversion level of the dopant atoms in the gain fiber.

Optical amplifier controllers are known in the prior art. The purpose of such controllers is to achieve and maintain a selected gain level. Such a controller may operate, for example, on the basis of a predetermined lookup table where an empirical determination is made between electrical power conducted to the optical pump and the resulting total amplifier gain. A selected signal gain set point is both achieved and maintained by the digital processor of the controller which uses the lookup table to select the amount of power conducted to the optical pump that correlates with a selected gain set point.

Other optical amplifier controllers are known which utilize photodiodes to continuously monitor the actual input and output power of the amplifier. The digital processor of the controller controls power conducted to the optical pump to modulate pump output power until the signal gain is equal to the selected gain set point. Such a design is advantageously more accurate and reliable than controllers which rely solely upon a predetermined lookup table since a lookup table may not accurately correlate actual signal gain to pump input power due to fluctuations in noise levels, diminishing pump efficiency over time, and different operating conditions of the amplifier.

Unfortunately, all such controllers which achieve and maintain a selected signal gain level by either directly or indirectly monitoring the total output of the amplifier can generate large transient power spikes in the surviving channels of the amplifier output when channels are added or dropped. This is a particularly bad problem in optical networks with dense wavelength division multiplex signals (DWDM), in which a rapid addition or dropping of a large proportion of input channels occurs. Such unwanted spikes come about from the fact that gain figure used by the controller is a total gain figure, from which an average gain for all of the amplifier channels is inferred. However, because the output of most amplifiers is not completely flat across its transmission spectrum, the gain level of some of the channels may be significantly higher than the gain level of other channels. Hence, the adding or dropping of a large proportion of the total number of available channels can result in a substantial, short-term over or under amplification of the surviving channels, thereby creating a transient spike in the amplifier output. Such spikes generate undesirable noise in the network, and can result in the temporary loss of a channel.

To minimize the noise generated by such spikes in DWDM networks, the optical amplifiers have one or more gain equalization filters (GEFs) in order to flatten the gain throughout a channel range that typically encompasses 43 channels equally spaced within a spectrum range of 1529.55 nm to 1563.05 nm. Unfortunately, such GEFs are relatively complex and expensive components. A less expensive alternative would be the use of a number of smaller amplifiers, each having a channel capacity of perhaps eight channels. The smaller channel capacity generates an inherently flatter output, thus obviating the need for GEFs. As a full signal load utilizing all 43 channels seldom occurs in many networks, the use of a fewer number of eight channel amplifiers is a practical alternative whose capacity could be easily expanded as needed by adding more such amplifiers on a "pay as you grow" basis. However, as the output of such optical amplifiers is not completely flat, and as the lower channel capacity makes it even more likely that a large percentage of the channels will be added or dropped during the operation of the network, the problem of noise generation from transient spikes would be even greater.

Clearly, what is needed is an optical amplifier controller which is capable of achieving and maintaining a gain set point which does not generate under-amplification or over-amplification spikes when a large proportion of available channels are added or dropped from the signal. Ideally, such a controller should be simply and inexpensively constructed from preexisting components of control circuitry. It would also be desirable if such a controller could also easily and cheaply provide an indication of the gain for each of the transmitted channels so that gain flattening measures may be taken when necessary.

SUMMARY OF THE INVENTION

The invention is a system and method for controlling a multi-channel optical amplifier that overcomes the aforementioned problems associated with the prior art by controlling the average inversion level of the dopant atoms in the gain fiber. In the method of the invention, a set point inversion level $N_{2ref}$ corresponding to a gain set point is first selected. Next, a pump light power output $P_p^m$ necessary to achieve the selected set point average inversion level $N_{2ref}$ from total amplifier optical power $$P_{in}^{tot}$$

and output power $$P_{tot}^{out},$$

and pump light remnant power $$P_p^{out}$$

is then determined. Finally, the power output $P_p^m$ of the pump light is adjusted to achieve and maintain the set point $N_{2ref}$ inversion level. The determining step of the method may include the step of determining an actual average inversion level over time $N_2(t)$ in accordance with the following formula:

$$\frac{dN_2}{dt} + \frac{1}{\tau}N_2 \approx K\lambda_p[P_p^{in} - P_p^{out}] - K[\lambda_m(P_{tot}^{out} - P_{in}^{tot}) + \Delta Pin]$$

wherein the power output $P_p^m$ of the pump light is adjusted to bring $N_2(t)$ equal to $N_{2ref}$.

Alternatively, the method may be implemented by adjusting the power output of the pump light $P_p^m$ in accordance with the following formula to maintain an actual steady state average inversion level $N_{2ss}$ equal to $N_{2ref}$:

$$P_p^{in} = P_p^{out} + \frac{1}{\tau K \lambda_p} \cdot N_{sref} + \frac{\lambda_m}{\lambda_p} \cdot (P_{tot}^{out} - P_{in}^{tot}) + \frac{1}{\lambda_p} \cdot \Delta Pin$$

In either embodiment of the method, the constant K is further considered in said determining step, wherein K equals $$\frac{1}{\tau L \zeta hc}$$

and $\tau$ is a spontaneous lifetime of the ions at the inverted quantum level, L is the length of the gain fiber, $\zeta$ is a saturation parameter defined as the ratio of linear density of ionized atoms to $\tau$, h is Planck's constant and c is the speed of light.

Preferably, the determining and adjusting steps of the invention are substantially continuous. The power adjusting step may be implemented by modulating a transmission of electrical power to the pump light source, or by modulating the optical output of the pump light source with a variable optical attenuator.

Advantageously, the same parameters used in modulating gain via an average inversion level may also be used to determine the linear gain per channel of optical input. In particular, linear gain per channel may be determined by first computing the average inversion level over time $N_2(t)$ in accordance with the above-referenced formula, and then determining linear gain for each channel i=1, 2, . . . in accordance with:

$$\ln\frac{P_i^{out}(t)}{P_i^{in}(t)} = [(\alpha_i + \gamma_i)\hat{N}_2(t) - \alpha_i]L = \hat{g}_i(t)L, i = 1, 2 \ldots n_s$$

where L is the length of the gain fiber, $\alpha_i$ is a channel absorption constant for a specified gain fiber, and $\gamma i$ is a channel emission constant for the gain fiber.

Once the linear gain per channel is determined, the gain curve of the amplifier may be flattened by the use of a variable optical attenuator.

The system of the invention includes analog circuitry capable of implementing the aforementioned method steps. The resulting control of the optical amplifier advantageously eliminates or at least ameliorates transient spikes in amplifier output resulting from the over or under amplification of surviving channels during the addition or dropping of channels. The use of the same parameters to control both amplifier gain and to determine linear gain per channel simplifies the amplifier controls, and allows both gain and tilt to be easily controlled through relatively simple and inexpensive analog circuitry.

BRIEF DESCRIPTION OF THE DRAWING

FIG. 13 is a graph illustrating input signal power change over time in an optical amplifier wherein seven of eight signals are dropped and then added;

FIGS. 14A and 14B illustrate the output power over time of a surviving channel when seven channels are dropped and the output power of surviving channel plus all seven channels when such channels are re-added, respectively;

DETAILED DESCRIPTION OF THE PREFERRED EMBODIMENTS

The inversion dynamics of an erbium doped fiber amplifier (EDFA) can be described by the following equation $$\frac{dN_2}{dt} + \frac{1}{\tau}N_2(t) = -\frac{1}{\tau L\xi}\sum_{i=1}^{n} Q_{pi}^{in}(t)[\exp(g_i(t)L) - 1] = \quad (1)$$

$$-\frac{1}{\tau L\xi}\sum_{i=pump}(Q_{pi}^{out}(t) - Q_{pi}^{in}(t)) - \frac{1}{\tau L\xi}\sum_{i=signal}(Q_i^{out}(t) - Q_i^{in}(t))$$

In the above equation (1) the following applies: $\tau$ is spontaneous lifetime of upper quantum level (s) of the dopant erbium atoms in the gain fiber, $\zeta$ is the saturation parameter of the gain fiber defined as the ratio of the linear density (m$^{-1}$) of erbium ions to the spontaneous lifetime, L is the erbium-doped fiber length (m), $$Q_{ti}^{in}(t)$$

is the pump intensity at the input of the erbium doped fiber coil, and $$Q_{pi}^{out}(t)$$

is the pump signal intensity at the coil output (or the remnant pump signal).

$$Q_{ti}^{in}(t)$$

and $$Q_i^{out}(t)$$

represent the signal optical intensities at the amplifier input and output, respectively.

The optical intensities in equation (1) are defined as Q=P/hv, where h is Planck's constant, v is frequency, and P is the optical power in watts. It is more convenient, for practical applications, to represent the aforementioned parameters in a format where optical power is represented in watts. A modified version of equation (1), where v=c/λ(c- the speed of light and λ=the wavelength of the optical signal) will have the following form:

$$\frac{dN_2(t)}{dt} + \frac{1}{\tau}N_2 = -\frac{1}{\tau L\xi}\sum_{i=1}^{n}\frac{P_i^{in}(t)}{hv_i}[\exp(g_i(t)L) - 1] = \quad (2)$$

$$-\frac{1}{\tau L\xi}\sum_{i=pump}\frac{1}{hv_{pi}}[P_{pi}^{out}(t) - P_{pi}^{in}(t)] -$$

$$\sum_{i=signal}\frac{1}{hv_{si}}\left[P_{si}^{out}(t) - P_{si}^{in}(t) = -\frac{1}{\tau L\xi hc}\right.$$

$$\left[\sum_{i=pump}\lambda_{pi}[P_{pi}^{out}(t) - P_{pi}^{in}(t)] - \sum_{i=signal}\lambda_{si}[P_{si}^{out}(t) - P_{si}^{in}(t)]\right]$$

From equation (2) it is clear that the inversion level depends on wavelengths λ of the signals, including pumps, present in optical amplifier.

Figure 1:
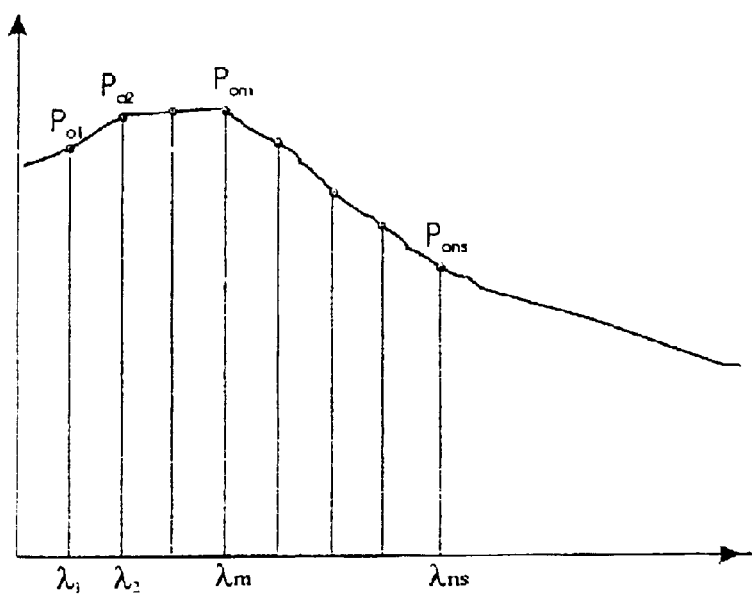
FIG. 1 is an exemplary graph of the relative power of $n_s$ channels of an optical amplifier output without a flattening component.

FIG. 1 is an illustration of how an amplifier gain spectrum might look like without the use of flattening component, such as a variable optical attenuator. In this particular case there are $n_s$ signals present in the amplifier.

Equation 2 may be represented in a different and even more practical form if the following assumptions are made:

A1. There can be up to $n_s$ signals or channels present in the amplifier. These channels are equally spaced with a wavelength difference between two adjacent channels of Δλ. The wavelengths of the channels are $\lambda_i$, i=1, 2, ..., $n_s$.

A2. The gain spectrum within the wavelength range given in A1 is relatively flat within some range ΔG(λ), $\lambda_1 \leq \lambda \leq \lambda_{ns}$ A3. All input signals have the same power, $$P_1^{in} = P_2^{in} = \cdots = P_{ns}^{in} = P^{in}.$$

A4. Amplifier spontaneous emission (ASE) is neglected.

Under these assumptions, the wavelength of i-th channel can be represented as:

$$\lambda_i = \lambda_1 + (i-1)\Delta\lambda, \ i=1, 2, \ldots, n_s \quad (3)$$

If we pick the $\lambda_m$ as a reference wavelength, then from (2) and (3) one can re-express equation (2) as follows:

$$\frac{dN_2}{dt} + \frac{1}{\tau}N_2 = K\lambda_p[P_p^{in} - P_p^{out}] - \quad (4)$$

$$K[\lambda_m(P_{tot}^{out} - P_{in}^{tot}) + \Delta Pin] + K[\Delta Po^+ - \Delta Po^-]$$

with $$\Delta Pin = \frac{\Delta\lambda}{n_s}\cdot\left[\frac{m\cdot(m-1)}{2} - \frac{(n_s-m)\cdot(n_s-m+1)}{2}\right]P_{tot}^{in} \quad (5a)$$

$$\Delta Po^+ = \Delta\lambda[(m-1)P_1^{out} + \cdots + P_{m-1}^{out}] \quad (5b)$$

$$\Delta Po^- = \Delta\lambda[P_{m+1}^{out} + \cdots + (n_s-m)P_{ns}^{out}] \quad (5c)$$

If we know total input and output signal power and input and remnant pump power the inversion level can be estimated from equation (4) with an error E equal to the last term of the above equation. So, we get the following approximate formula:

$$\frac{dN_2}{dt} + \frac{1}{\tau}N_2 \approx K\lambda_p[P_p^{in} - P_p^{out}] - K[\lambda_m(P_{tot}^{out} - P_{in}^{tot}) + \Delta Pin] \quad (6)$$

The estimation error $$\varepsilon = K(\Delta Po^+ - \Delta Po^-) = \quad (7)$$

$$K\Delta\lambda[((m-1)(P_1^{out} + \cdots + P_{m-1}^{out}) - (P_{m+1}^{out} + \cdots + (n_s-m)P_{ns}^{out})]$$

can be tuned (minimized) by changing reference wavelength parameter m. Changing this parameter will impact equation (7) via $\lambda_{in}$ and ΔPin. This impact is illustrated by the example given below.

EXAMPLE 1

Figure 2:
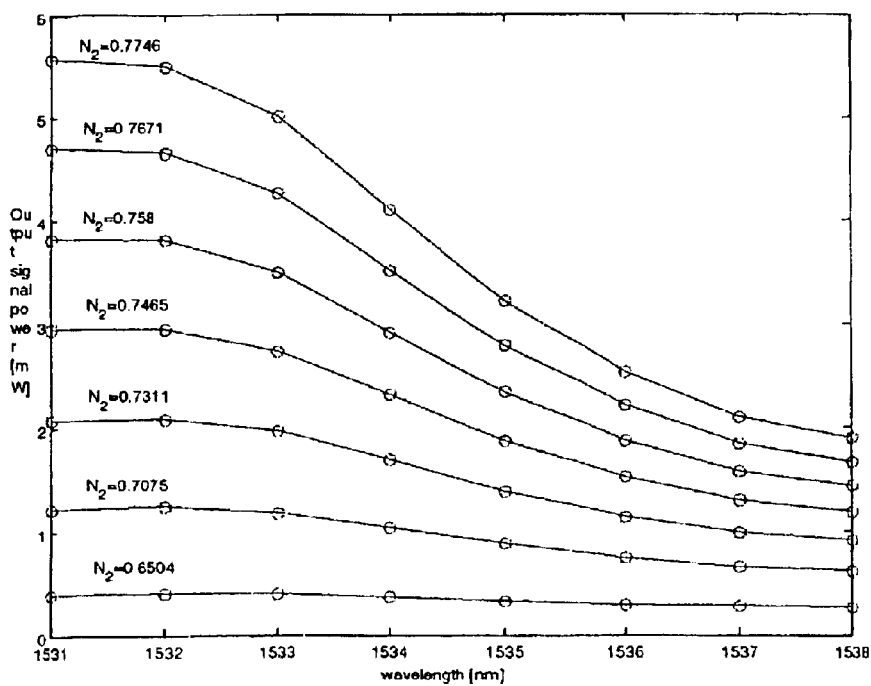
FIG. 2 is a graph illustrating signal output power versus signal wavelength for several different inversion levels where eight signal channels are present, showing in particular how tilt increases with amplification.
Figure 3:
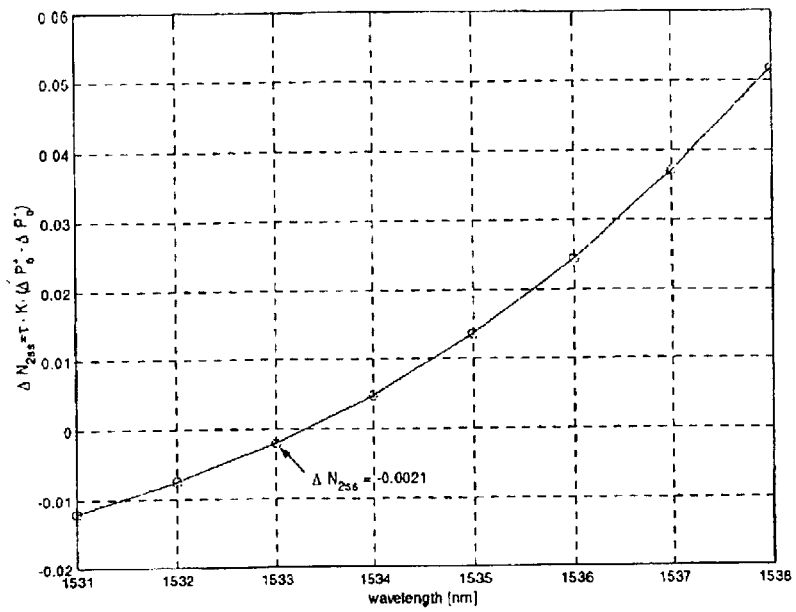
FIG. 3 is a graph illustrating the error in $N_2$ estimation when equation (6) is used for different wavelengths.

Eight signals of the same power $P_i^{in}$=0.01 mW, i=1, 2, ..., 8 are introduced to an erbium-doped fiber amplifier (EDFA) coil. The length of the coil is 10 m. A 980 nm pump laser with forward pumping has a constant power output. FIG. 2 shows signal powers at EDFA outputs for several different pump powers. Pump power starts from 10 mW (bottom trace) and increases in increments of 10 mW (top trace). The inversion level estimation error (7) was calculated for m=1, 2, ..., 8 and FIG. 3 shows that this error has its minimum equal to ε=−0.0021 at m=3.

Figure 4:
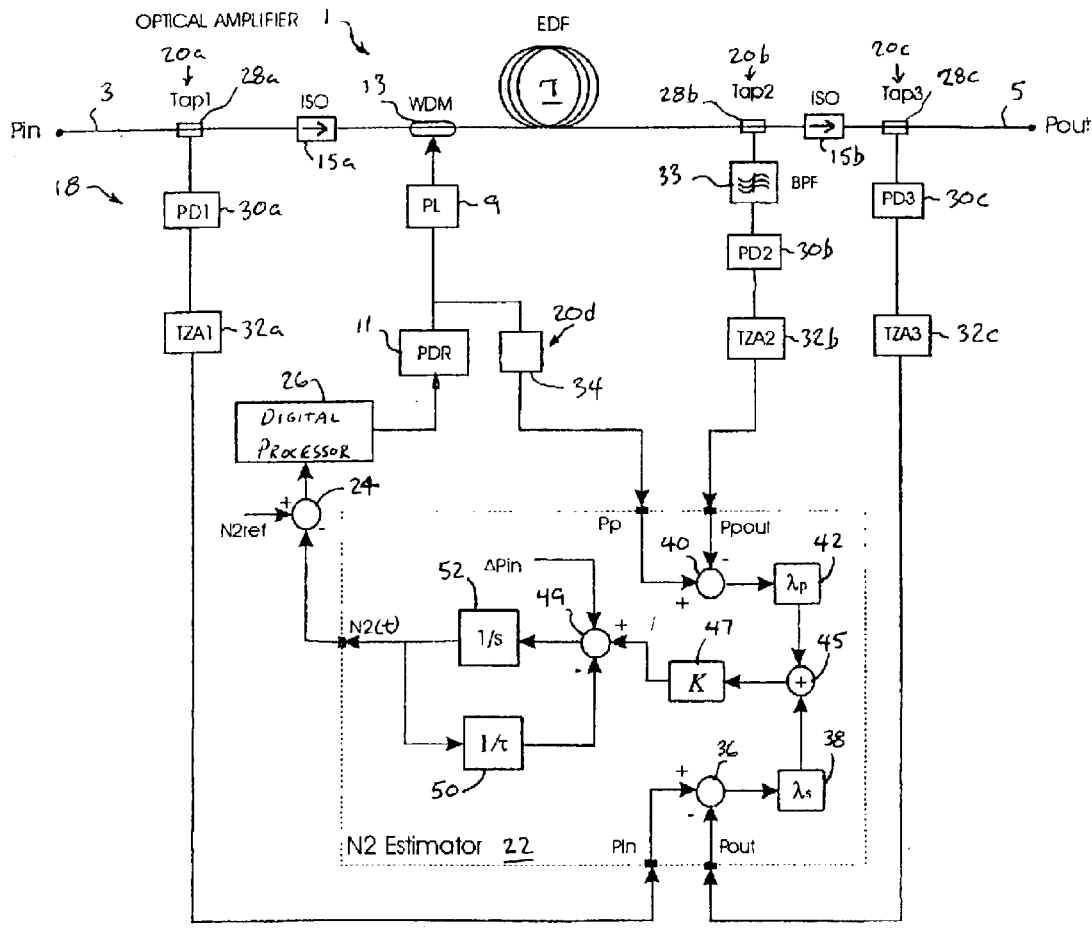
FIG. 4 is a schematic of an optical amplifier having a control circuit which operates on the basis of control of inversion levels via equation (6)

Equation (6) used for the estimation of inversion level, $N_2(t)$, can be implemented by the relatively simple electric circuit shown in FIG. 4. Input parameters for equation (6) are optical powers of input signal, $$P_{tot}^{in}(t),$$

output signal $$P_{tot}^{out}t,$$

input pump power $$P_p^{in}(t),$$

remnant pump power, $$P_p^{out}(t),$$

and a correction factor, $\Delta P_{in}$. Since the correction factor $\Delta P_{in}$ has a small value (as shown in FIG. 3), it can be dropped from equation (6) without a significant impact on its accuracy.

FIG. 4 is a schematic diagram of a multi-channel optical amplifier having a control circuit 18 that achieves and maintains a desired gain level by maintaining a corresponding inversion level. The optical amplifier 1 includes an input end 3, an output end 5, and a coil of erbium doped fiber 7. A pump light 9 is optically coupled between the input end 3 and an input of the erbium doped fiber 7 via a wave division multiplexer 13. A pump drive 11 supplies power to the pump light 9. Optical isolators 15a, b prevent the output of the pump light 9 from being transmitted into the input end 3 of the amplifier 1.

The control circuit 18 of the optical amplifier 1 includes monitoring circuits 20a, b, c, d for generating electrical signals indicative of the total input power $P_p^{in}$ the total pump power output $$P_{in}^{tot},$$

total amplifier power output $$P_p^{out},$$

and pump input power $$P_{tot}^{out},$$

respectively. Control circuit 18 further includes an inversion level estimator circuit 22 for estimating the average inversion level of the amplified signal wavelengths of the amplifier 1, as well as a setpoint circuit 24 for generating a signal indicative of a difference between the average inversion level computed by the estimator circuit 22, and a desired average inversion level setpoint that corresponds to a desired gain level of the optical amplifier 1. Finally, control circuit 18 includes a digital processor 26 for receiving the difference signal generated by the setpoint signal 24, and for generating a control signal to the pump drive 11 which will change the power level of the pump light 9 so as to eliminate any difference signal received by the setpoint circuit 24.

Each of the monitoring circuits 20a, b, c of the control circuit 18 includes an optical tap 28a, b, c for tapping a small percentage of the light from the optical amplifier 1 at the points indicated; a photodiode 30a, b, c for converting the tapped light into an electrical signal, and a transimpedance amplifier 32a, b, c for amplifying the electrical signals generated by the photodiodes 30a, b, c, respectively. Monitoring circuit 20b includes a pump light filter 33 so that only pump light is conducted to photodiode 30b. Monitoring circuit 20d is formed from a signal generator 34 connected between the pump drive 11 and the pump light 9 for converting the electrical current conducted between these two components into a signal indicative of the input power of the pump light $P_p^{in}$.

Finally, the inversion level estimator circuit 22 includes a difference circuit 36 connected to the signal power monitoring circuit 20a and amplifier output monitoring circuit 20c for generating a signal indicative of total amplifier gain. The output of the difference circuit 36 is conducted to a product circuit 38 which multiplies the signal received from the difference circuit 36 by a signal wavelength $\lambda_s$, which may correspond to the reference wavelength $\lambda_m$. The estimator circuit 22 further includes another difference circuit 40 connected to both the monitoring circuit 20b that generates a signal indicative of pump output power, and to the monitoring circuit 20d, that generates a signal indicative of pump input power. The resulting signal is indicative of pump remnant power, and is conducted to the product circuit 42, which multiplies the pump remnant signal times the wavelength of the pump light $\lambda_p$. Both the signals from the product circuits 38 and 42 are transmitted to a summation circuit 45, which generates a signal indicative of the value of the sum of the signals received from circuits 38 and 42. The resulting sum signal is conducted to a product circuit 47, which multiplies the sum signal received by the constant K, and transmits a signal indicative of the resulting product to summation circuit 49. The circuit 49 receives a signal indicative of $\Delta P_{in}$ and adds this to the product signal received from circuit 47. Circuit 49 further receives and subtracts a signal from a quotient circuit 50 that computes the reciprocal of $\tau$ (which is the spontaneous lifetime of the upper quantum level (S) of the dopant erbium atoms in the gain fiber) and multiples this number times $N_2(t)$. The resulting signal is multiplied by the quotient of time by product circuit 52, which is the quotient of time, in order to produce a signal indicative of the estimated inversion level, $N_2(t)$.

In operation a desired setpoint value $N_{2ref}(t)$ of inversion level is selected via the setpoint circuit 24 that corresponds to a desired gain level $P_{out}$. This desired setpoint value $N_{2ref}(t)$ is compared with an estimated actual inversion level $N_2(t)$ generated by the estimator circuit 22, and an error signal is then generated by the difference between the desired and actual inversion levels as follows:

$$e(t)=N_{2ref}-N_2(t)$$

This error e(t) is transmitted to the digital processor 26, which generates and transmits a control signal to the pump drive 11 indicative of the amount of electrical current that the pump drive 11 should supply to the pump light to achieve the desired inversion level $N_{2ref}(t)$. This current will drive the pump laser 9 such that the error signal (8) is minimized (ideally equal to zero). The estimator circuit 22 can be realized by simple and inexpensive analog electronic circuits. There is no need for a ratio circuit, which simplifies the structure of the estimator circuit 72 and the control algorithm employed by the digital processor 26.

A comparative example of how the output power $$P_{total}^{out}$$

of the optical amplifier 1 responds to added signals will now be given, first with a conventional gain control circuit and then with the inversion control circuit of the invention.

Figure 5:
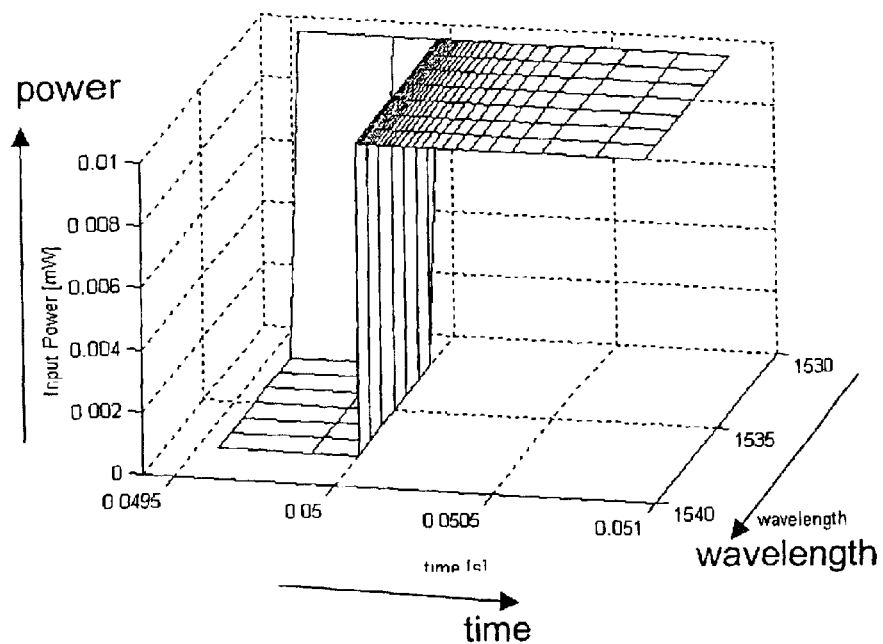
FIG. 5 illustrates the increase in input power to an optical amplifier over time when seven additional signals are added to a single surviving signal.
Figure 6:
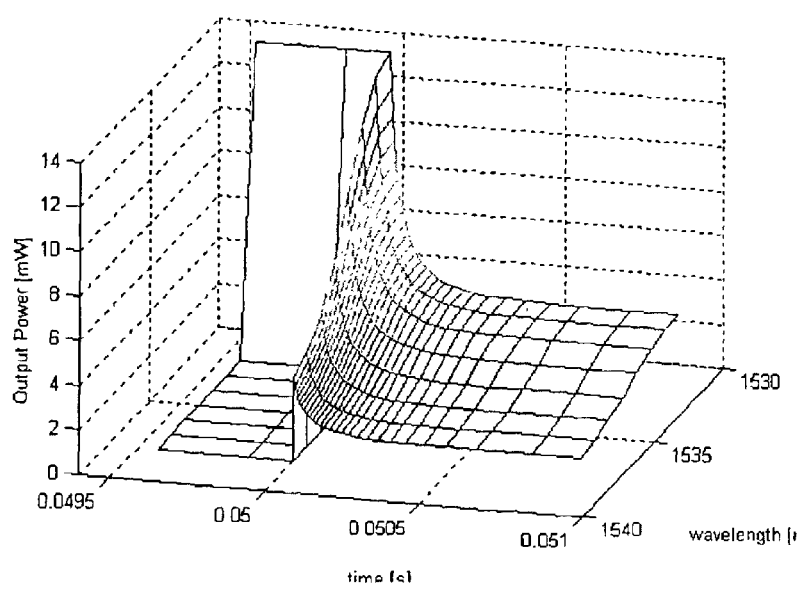
FIG. 6 is a graph illustrating the output signal power change over time when the additional channels indicated in FIG. 5 are added when there is no transient control in the optical amplifier.

Assume that initially there is only one (surviving) signal at wavelength $\lambda_{1}=1531$ nm present in the amplifier. At time t=0.05s seven additional signals at wavelengths 1532–1538 nm are added. This scenario is illustrated in FIG. 5. FIG. 6 shows the output of an amplifier with a standard gain controller that operates without inversion control. Notice the large spikes in the added channels and the concurrent large drop of power in the surviving signals right after the signal add event. Since there is no gain flattening filter present in the amplifier, the signal powers are not equalized—lower wavelength signals are stronger.

Figure 7:
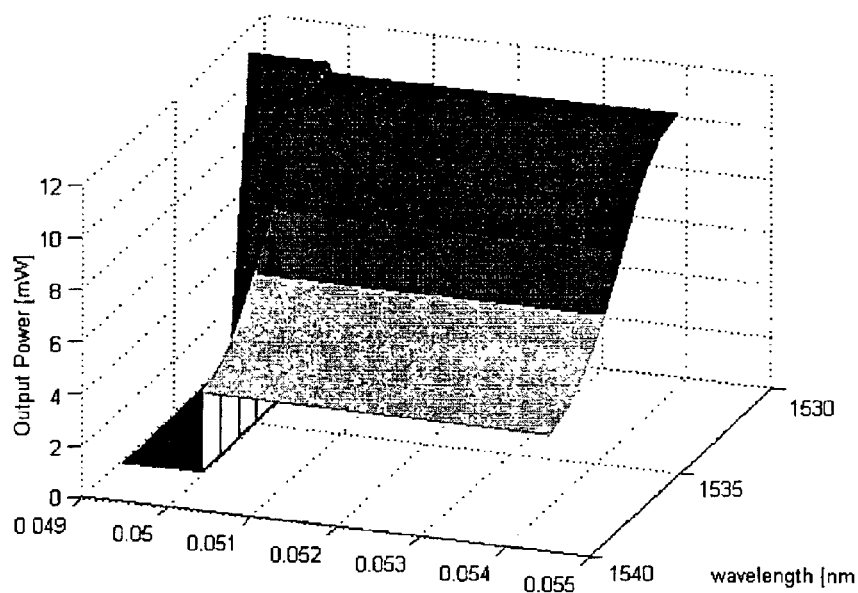
FIG. 7 illustrates output power of an optical amplifier when additional channels are added when transient control is in place.
Figure 8A:
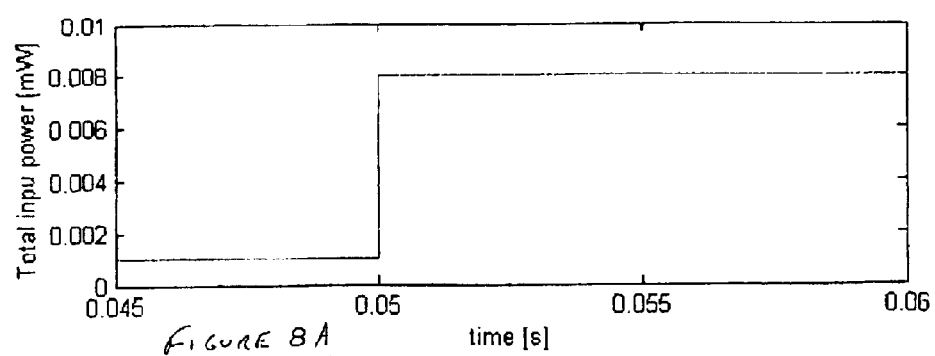
FIGS. 8A and 8B illustrate in two dimensions the input and output power over time shown in three dimensions in FIGS. 5 and 7.
Figure 8B:
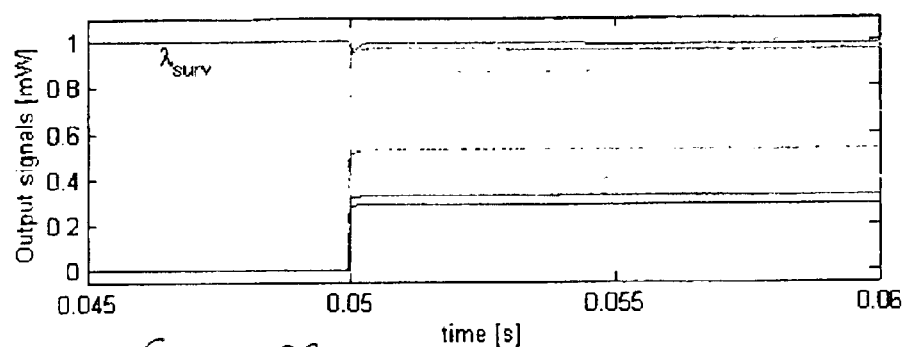

Now assume that an inversion level control circuit is used such that the inversion level is kept constant at $N_{2ref}=0.85$. FIG. 7 shows how the level of the surviving signal changed very little and that the seven added signals did not experience large transient spikes after the signal add event. These same results are shown in two dimensions in FIGS. 8A and 8B. Only a very small undershoot is present in the surviving signal power.

Figure 9A:
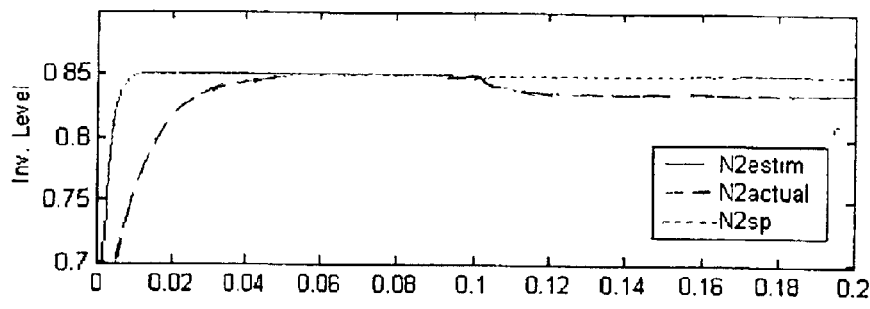
FIGS. 9A and 9B illustrate changes in the inversion level of a reference wavelength $\lambda_m$=1551 nm over time and the amplifier output power when seven channels have been added, respectively.
Figure 9B:
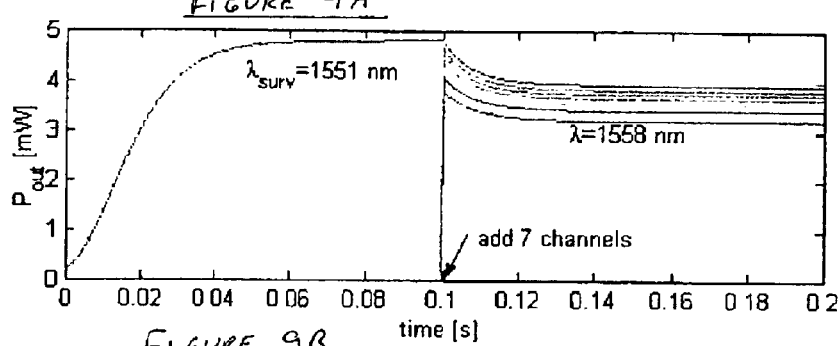
Figure 10A:
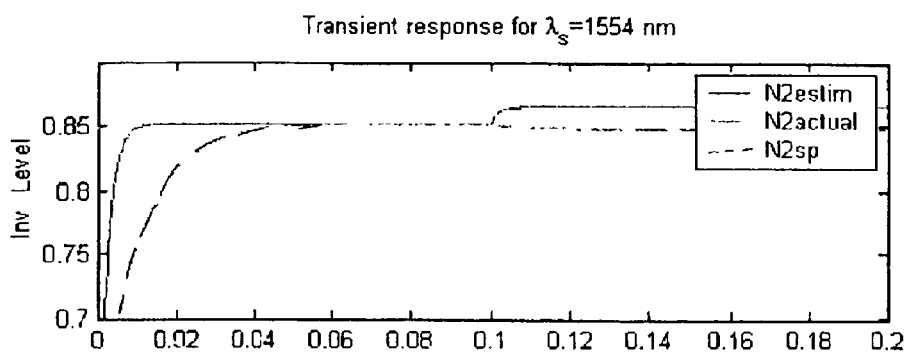
FIGS. 10A and 10B illustrate changes in the inversion level over time when the reference wavelength $\lambda_m$=1554 nm, and the output power of the optical amplifier when seven channels are added, respectively.
Figure 10B:
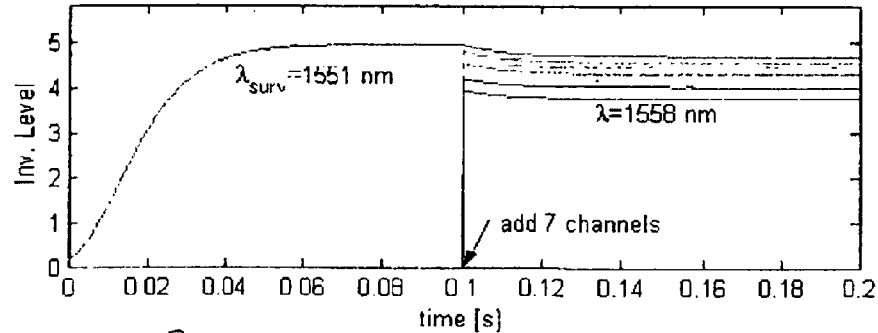
Figure 11A:
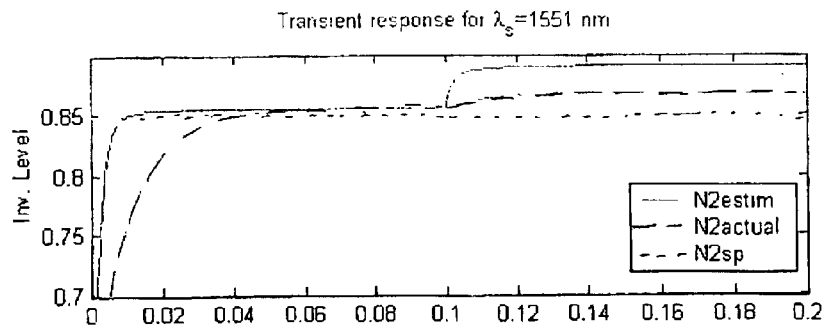
FIGS. 11A and 11B illustrate inversion level over time when the reference wavelength $\lambda_m$=1558 nm, and the output power of an optical amplifier when seven channels are added, respectively.
Figure 11B:
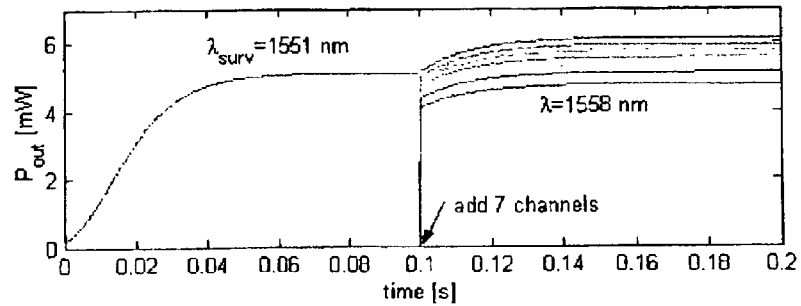

The choice of the reference wavelength $\lambda_m$ in formula (6) affects the transient response of $$P_{tot}^{out},$$

and hence should be chosen to minimize transient spikes, as illustrated in the following examples. In all of these examples, seven channels are added at t=0.05s. The surviving channel wavelength is $\lambda_{sv}=1551$ nm. In the first case, eight wavelengths ranging from 1551 nm–1558 nm are used. If a relatively low reference wavelength $\lambda_m=1551$ is used, the estimator circuit 22 gives a slightly lower inversion level, which results in a negative offset in the surviving channel (shown in FIG. 9). If the reference wavelength $\lambda_m$ is in the middle (1554 nm), the surviving signal offset is improved (FIG. 10). However when $\lambda_m=1558$ nm, the estimator circuit 22 gives a higher inversion level value and it results in a positive steady state offset in the surviving channel (FIG. 11). Hence in this example the use of a middle wavelength as the reference wavelength $\lambda_m$ results in the least amount of error.

In another embodiment of the invention, control of the optical amplifier 1 may be based upon a calculated steady state value of the inversion level that corresponds to a desired gain level, $N_{2ss}$ rather than the real time estimation of the inversion level given by equation (6).

The inversion level steady state value $N_{2ss}$ can be calculated from (6) as follows:

$$N_{2ss} \approx \tau K \lambda_p [P_p^{in} - P_p^{out}] - K\tau_m(P_{tot}^{out} - P_{in}^{tot}) + \Delta Pin] \quad (8)$$

In order to bring this inversion level to a setpoint value, $N_{2ref}$, the following condition has to be satisfied:

$$N_{sref} = N_{2ss} \approx \tau K \lambda_p [P_p^{in} - P_p^{out}] - \tau K[\lambda_m(P_{tot}^{out} - P_{in}^{tot}) + \Delta Pin] \quad (10)$$

This can be accomplished by changing the pump power $P_p^{in}$ (from (10)) such that:

$$P_p^{in} = P_p^{out} + \frac{1}{\tau K \lambda_p} \cdot N_{sref} + \frac{\lambda_m}{\lambda_p} \cdot (P_{tot}^{out} - P_{in}^{tot}) + \frac{1}{\lambda_p} \cdot \Delta Pin \quad (11)$$

Figure 12:
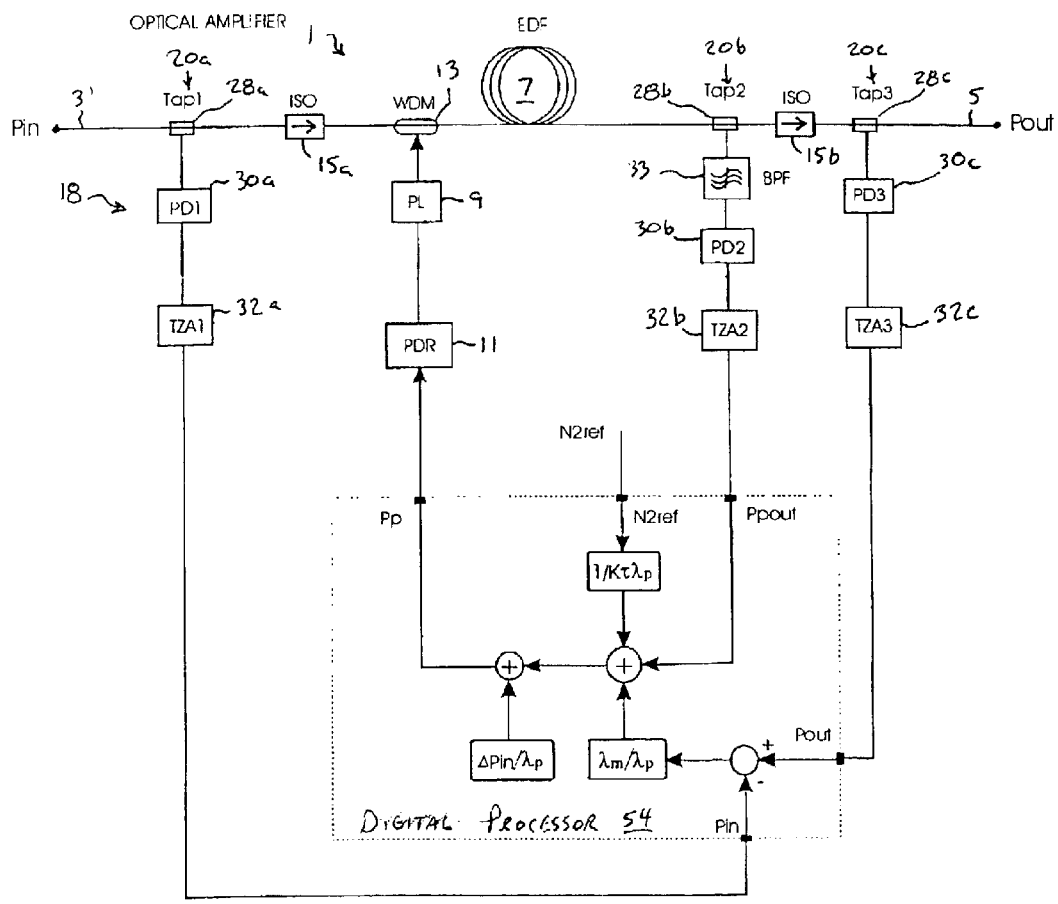
FIG. 12 is a schematic diagram of an optical amplifier having an inversion level control which operates on the basis of a steady state inversion level computed via equation (8)

The control law (11) is a simple equation which can be realized either by analog or digital electronics. FIG. 12 is an illustrative example of implementation of the control. In this control scheme the input and output total signal power $$P_{tot}^{in}, P_{tot}^{out},$$

as well as remnant pump power $$P_p^{out},$$

are measured by monitoring circuits 20a, 20b, 20c that redirect 2–10 percent of optical signal powers via taps 28a, 28b, 28c to photodiodes 30a, 30b, 30c and transimpedance amplifiers 32a, 32b, 32c, where the signals are conditioned to appropriate voltages. These voltages carrying information about total optical signal powers are input to the processor circuit 54, which is a digital processor in this preferred embodiment. The pump control signal, calculated by the processor circuit 54, is converted by the pump drive (PDR) circuit 11 into the pump current. This current will drive the pump laser 9 (PL) such that the inversion level $N_2$ is equal to $$N_2 + N_{sref} + \epsilon \quad (12)$$

where $\epsilon$ is the error defined by formula (7). This error would be equal to zero if the gain spectrum were flat. The spectrum can be flattened by a gain flattening filter, but it is not used in this embodiment.

Assume that we want to move the inversion level (or gain corresponding to this inversion level) from $N_{2ref}$ to a new value $N_{2ref}+\Delta N_2$. Then, equation (6) can be represented as $$\frac{d(N_{ref} + \Delta N_2(t))}{dt} + \frac{1}{\tau}(N_{2ref} + \Delta N_2(t)) \approx K\lambda_p[P_p^{in} - P_p^{out}] - K[\lambda_m(P_{tot}^{out} - P_{in}^{tot}) + \Delta Pin] + K\lambda_p[\Delta P_p^{in} - \Delta P_p^{out}] - K\lambda_m \Delta P_{tot}^{out}$$

from which we extract the dynamic part:

$$\frac{d\Delta N_2(t)}{dt} + \frac{1}{\tau}\Delta N_2(t) \approx K\lambda_p[\Delta P_p^{in}(t) - \Delta P_p^{out}(t)] - K\lambda_m \Delta P_{tot}^{out}(t) \quad (13)$$

The above equation can be represented in operator form (with s=d/dt) as:

$$\Delta N_2(t) \approx \frac{\tau K[\lambda_p \Delta P_p^{in}(t) - \Delta P_p^{out}(t) - \lambda_m \Delta P_{tot}^{out}(t)]}{\tau s + 1} \quad (14)$$

This equation shows that the dynamics of the inversion level (gain setpoint) change will have a pole at s=1/τ so it will be dominated by the dynamics of erbium defined by its fluorescence time constant τ, regardless of the pump action. In other words, inversion level will change from one reference value to another within tens of milliseconds, as follows:

$$\Delta N_2(t) \approx K[\lambda_p \Delta P_p^{in}(t) - \Delta P_p^{out}(t) - \lambda_m \Delta P_{tot}^{out}(t)] \,(1 - \exp(-t/\tau)) \quad (15)$$

This will be illustrated in the Example in the text below.

If it is required that the inversion level change happens faster than within tens of milliseconds (20–40 ms), then it will be necessary to use an additional control algorithm.

Assume that initially there eight optical signals equally spaced in wavelength present in the single coil erbium-doped fiber amplifier (EDFA). The length of the fiber is 10 m. Wavelengths of the signals range from $\lambda_1$=1531 nm to $\lambda_8$=1538 nm with spacing in between of $\Delta\lambda$=1 nm. The optical power of each signal is 0.11 mW. At time t=0.05 s seven signals of wavelengths 1532–1538 nm are dropped and then added at t=0.1 s, as illustrated in FIG. 13.

The output of the amplifier without inversion control is shown in FIGS. 14A and 14B. FIG. 14A represents the signal drop and FIG. 14B illustrates the signal add. At the drop event, the surviving channel will rise slowly to its new steady state. On the other hand, when the signals are dropped, they will experience large spikes almost instantly and then will decay to their steady state values. At the same time the surviving signal will drop at the same speed at which the added signals decayed. The drop in the surviving signal power is large and it can deteriorate the bit error rate, especially if the amplifier is used to cascade with other similar modules. Also, spikes in added signals may cause damage of optical receivers. Since there is no gain flattening filter present in the amplifier, the signal powers at amplifier output are not equal—lower wavelength signals are stronger than the ones at higher wavelengths. In this example $\lambda_m$=1534 nm and $\lambda_p$=980 nm were used.

Figure 15:
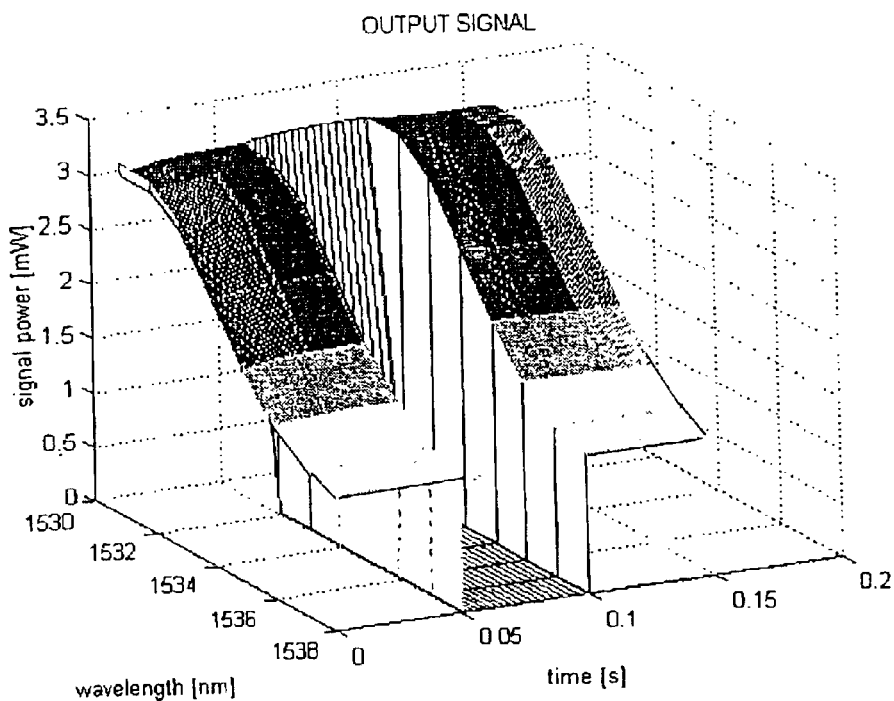
FIG. 15 illustrates change in power of the output signals of an optical amplifier with the inversion level control illustrated in FIG. 12 when seven channels are dropped and then added.

FIG. 15 illustrates the add/drop event when the inversion level controller 18 of the amplifier 1 is used. Here, the controller keeps the average inversion level at $N_{2ref}$=0.075. FIG. 15 shows that the surviving signal changed its level very little (approximately 0.18 dB) and that the seven added signals did not experience any transient spikes after the add/drop event. The same results are shown in two dimensions in FIGS. 16A and 16B. Undershoot and overshoot is virtually absent in the transient response in the surviving signal power illustrated in FIG. 16A. The pump control signal is shown in FIG. 16B.

The offset of 0.18 dB in surviving channel is caused by the error $\epsilon$ in inversion level control of $$N_2(t) = N_{2ref} + \Delta N_2(t) \quad (16)$$

From (4) and (12) one can obtain the following:

$$\frac{d\Delta N_2(t)}{dt} + \frac{1}{\tau}\Delta N_2(t) = \varepsilon \quad (17)$$

which leads to change inversion level control error $$\Delta N_2(t) = \tau\epsilon \cdot [1-\exp(-t/\tau)] \quad (18)$$

Figure 16A:
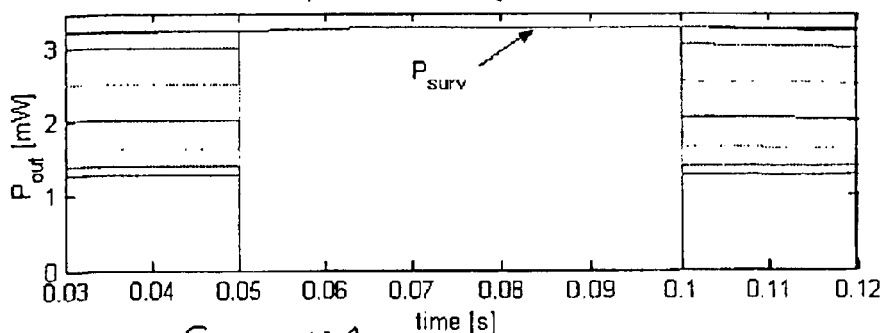
FIGS. 16A and 16B illustrate the output power over time, and the pump power over time, respectively, when seven of eight channels are dropped and then added, with invention level control present.
Figure 16B:
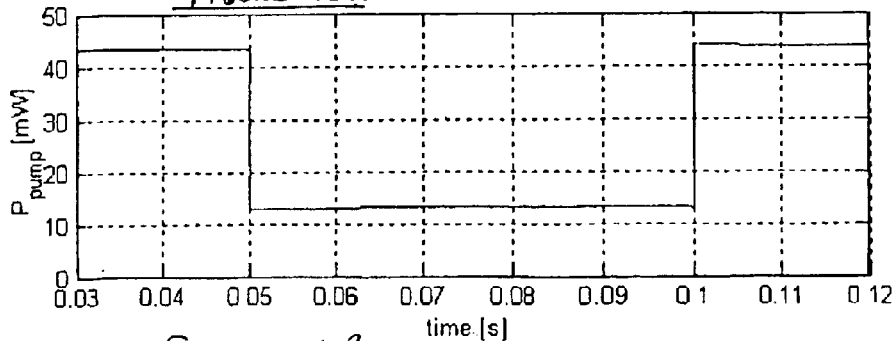

This will cause an offset in output power of the surviving signal shown in FIG. 16A. The final value of this offset will be reached at the speed defined by the erbium fluorescent time constant $\tau$, as shown in (18). This offset can be further reduced (or eliminated) by a gain flattening filter.

If the wavelengths of signals present in the amplifier are closer to the high end of C-band, i.e., in the range of 1555 nm–1563 nm, the surviving channel power offset would be much lower than 0.245 dB, since the spectrum tilt in this wavelength range is much lower than the gain tilt in the range of 1531 nm–1538 nm used in this example.

Figure 17A:
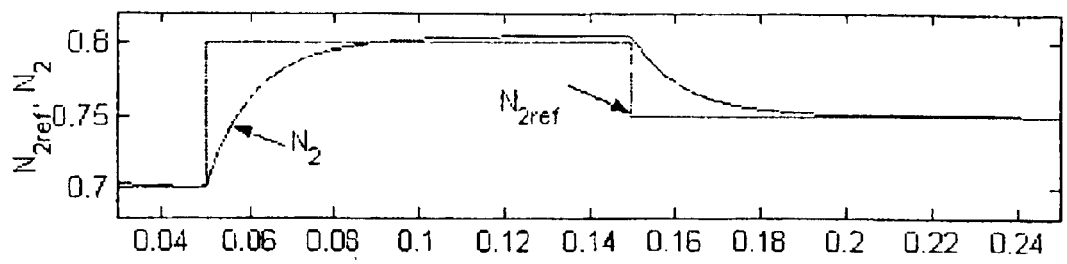
FIGS. 17A, 17B, and 17C illustrate inversion level over time, optical amplifier output power over time (per channel), and pump power over time for a setpoint change of inversion level, respectively.
Figure 17B:
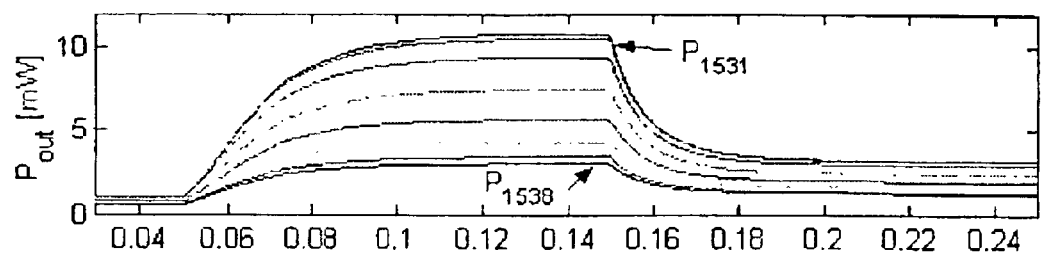
Figure 17C:
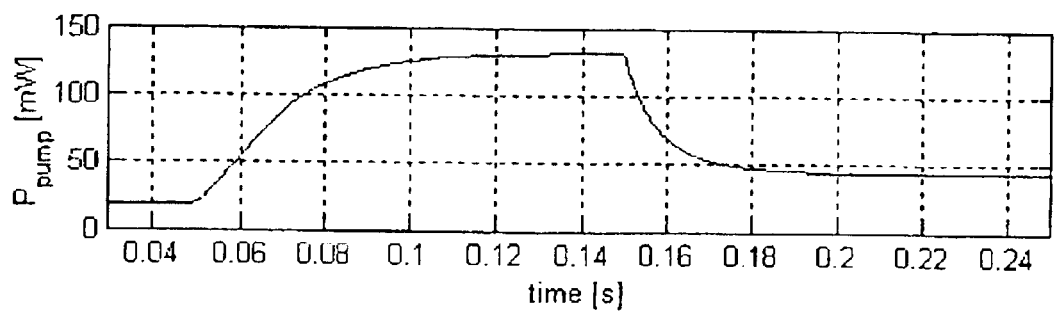

In this next example, eight channels in the range of 1531 nm–1538 nm are present in the amplifier all the time. At t0.05 s the inversion level setpoint $N_{2ref}$ is changed from 0.7 to 0.8 and at t=0.15 s it is decreased to 0.75. FIG. 17A shows the change of inversion level setpoint and actual inversion level. FIG. 17B illustrates the output signal power change for all signal wavelengths, and FIG. 17C is the pump power.

Figure 18:
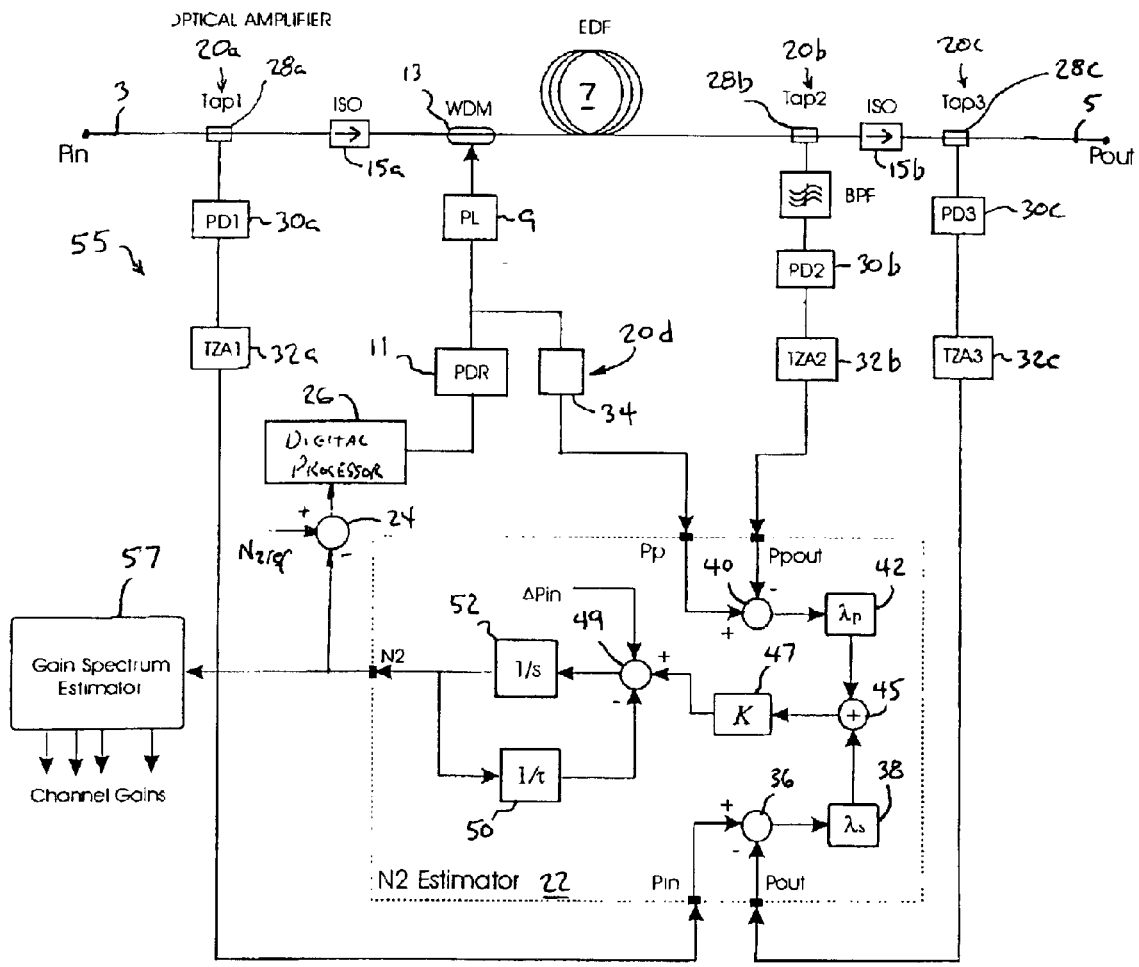
FIG. 18 is a schematic diagram of an optical amplifier with an inversion level controller in combination with a gain spectrum estimator.

FIG. 18 illustrates a modified control circuit 55 that takes advantage of the fact that the output of the inversion level estimator circuit 22 may advantageously be used to compute the gain of each of the individual channel signals $\lambda_1, \ldots \lambda_n$ amplified by the optical amplifier 1. In this embodiment of the invention, the control circuit 55 includes all of the elements of the control circuit 18 discussed with respect to FIG. 4 plus the addition of a gain estimator circuit 57 connected to the output of the $n_2$ estimator 22. The gain estimator circuit 47 includes a processor that works as follows: if we assume that homogeneous broadening is in place, then the following equation may be derived from equation (10):

$$\frac{P_i^{out}}{P_i^{in}} = [(\alpha_i + \gamma_i)\hat{N}_2(t) - \alpha_i]L = \hat{g}_i(t)L, \quad i = 1, \ldots 2 \ldots \quad (19)$$

From the above formula we can calculate linear gain per channel as:

$$\frac{P_i^{out}(t)}{P_i^{in}(t)} = \hat{G}_i(t) = \exp[\hat{g}_i(t)L], \quad i = 1, \ldots 2, \ldots \quad (20)$$

A set of gains (20) gives a good representation of the gain spectrum, which can be calculated easily. Equation (20) may be rewritten in logarithmic scale to give the gain spectrum in dB is follows:

$$\hat{G}_{idB}(t) = (10 \log e)\hat{g}_i(t)L = 4.3429 \cdot \hat{g}_i(t)L, \; i=1,.2 \quad (21)$$

The processor of the gain estimator circuit 57 may provide a more accurate estimation of the gain of each of the channel signals $\lambda_1, \ldots \lambda_n$ if the estimation error $\epsilon$ from $$\hat{N}_2(t)$$

$$N_2 = \hat{N}_2 + \varepsilon$$

equation (7) is factored in. The relationship between the true value of inversion level $N_2(t)$ and its estimated counterpart is given by (22)

where the estimation error $\epsilon$ is defined by (7), so the gain estimation error can be calculated for each signal channel from:

$$Gi(t) = \exp\{[(\alpha_i + \gamma_i)(N_2 + \epsilon) - \alpha_i]L\} = \bar{G}_i + \Delta G_i, i=1,.2 \quad (23)$$

to give, after some calculations $$\Delta G_i(t) \approx \hat{G}_i(\alpha_i + \gamma_i)\epsilon L, \; i=1,.2, \quad (24)$$

This error in can be represented in dB (from (21) as:

$$\Delta G_{idB}(t) = 4.3429 \cdot (\alpha_i + \gamma_i)\epsilon L, \; i=1,.2 \quad (25)$$

Figure 19:
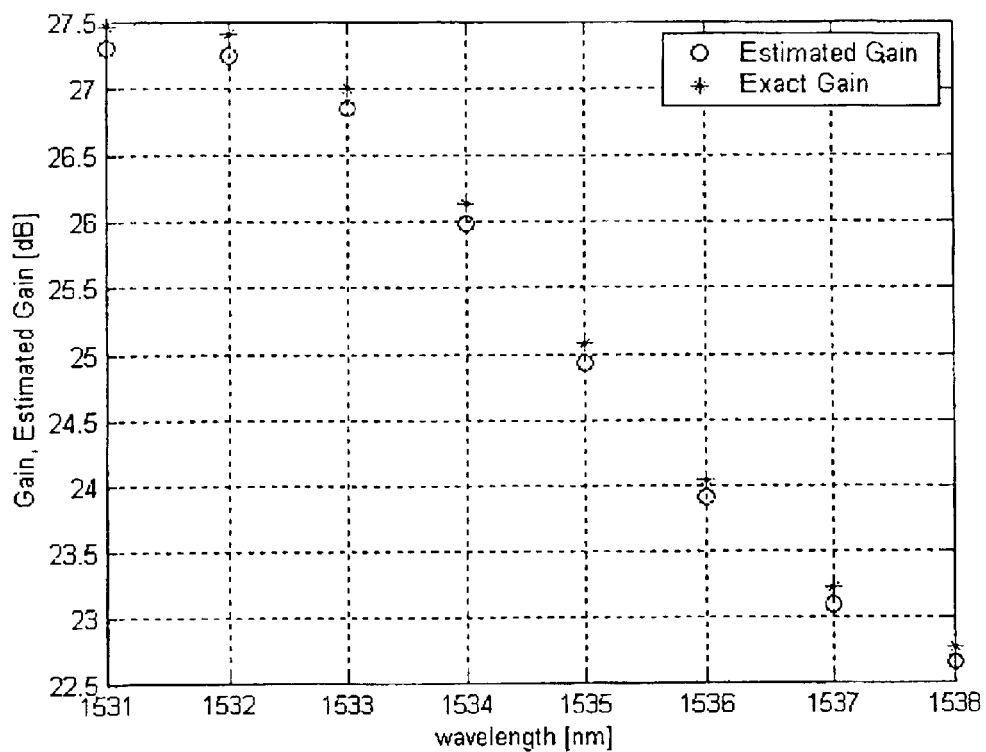
FIG. 19 is a graph illustrating performance of the on-line spectrum estimator illustrated in FIG. 18, comparing the estimated gain with the exact gain.

An example of the performance of the optical gain estimator is shown in FIG. 19, where circles represent the estimated value of the gain spectrum and stars represent the true spectrum. The estimation error here is approximately 0.15 dB. The amplifier operated in 'open-loop' mode in this example, i.e., the pump power was kept constant at level of 70 mW. The EDFA coil length was 10 m.

Figure 20:
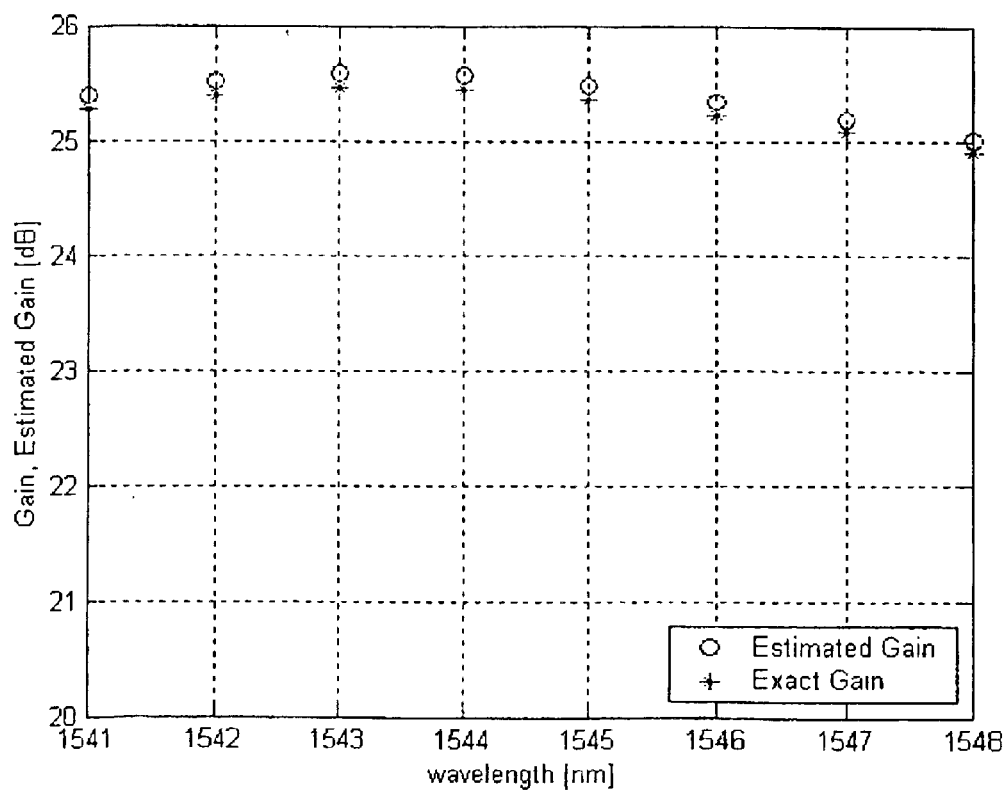
FIG. 20 is another illustration of the on-line spectrum estimator of FIG. 18 for another set of wavelengths.

The gain spectrum estimation error is even smaller if another set of the wavelength is used: $\lambda_1 = 1541$ nm, ..., $\lambda_8 = 1548$ nm (FIG. 20). In this example the gain estimation error is approximately 0.11 dB. In both FIGS. 19 and 20 input power per channel was 0.01 mW.

The gain spectrum estimator 57 can advantageously be used as a rough on-line monitor of gain spectrum in erbium-doped fiber amplifiers (EDFAs) with a relatively low number of signals grouped together (i.e., a band amplifier). Such an estimator 57, when properly integrated in an optical amplifier, can serve as an optical performance monitor and can improve the performance of the optical amplifier 1 in either the steady state or transient regime.

While this invention has been described in terms of several preferred embodiments, various modifications and additions may become apparent to persons of skill in the art. All such modifications, variations, and additions are intended to be written within the scope of this invention, which is limited only by the claims attached hereto.

PARTS LIST

| | |
|---|---|
| 1. | Optical amplifier |
| 3. | Input end |
| 5. | Output end |
| 7. | Erbium doped fiber |
| 9. | Pump light |
| 11. | Pump drive |
| 13. | Wave division multiplexer |
| 15. | Optical isolators a, b |
| 18, | Control circuit |
| 20. | Monitoring circuits a, b, c, d |
| 22. | Inversion level ($N_2(t)$) estimator circuit |
| 24. | Setpoint circuit |
| 26. | Digital processor |
| 28. | Optical taps a, b, c |
| 30. | Photodiodes a, b, c |
| 32. | Transimpedance amplifiers a, b, c |
| 33. | Pump light filter |
| 34. | Signal generator |
| 36. | Difference circuit for $P_{in}^{tot}$ and $P_{tot}^{out}$ |
| 38. | Product circuit for $\lambda_p$ |
| 40. | Difference circuit for $P_p^{in}$ and $P_p^{out}$ |
| 42. | Product circuit for $\lambda_p$ |
| 45. | Summation circuit |
| 47. | Product circuit for constant K |
| 49. | Difference and summation circuit |
| 50. | Quotient circuit |
| 52. | Product circuit |
| 55. | Control circuit |
| 57. | Gain spectrum estimator |

What is claimed is:

1. A method for controlling a multi-channel optical amplifier of the type having a gain fiber containing dopant atoms excitable to an inverted quantum level by a source of pump-light, comprising the steps of:

selecting a set point average inversion level $N_{2ref}$ of said dopant atoms that corresponds to a desired amplifier gain level;

determining a pump light power output $P_p^m$ necessary to achieve said $N_{2ref}$ from total amplifier optical input power $$P_{in}^{tot}$$

and output power $$P_{tot}^{out},$$

and pump light remnant power $$P_p^{out},$$

and adjusting the power output $P_p^m$ of the pump light to achieve and maintain said set point $N_{2ref}$ inversion level.

2. The method as defined in claim 1, wherein the wavelength $\lambda_p$ of the pump light and a reference wavelength $\lambda_m$ within a signal spectrum of the amplifier and a spontaneous lifetime $\tau$ of said ions at said inverted quantum level is also considered in said determining step.

3. The method as defined in claim 2, wherein a constant K is further considered in said determining step, wherein K equals $$\frac{1}{\tau L \zeta hc}$$

and L is the length of the gain fiber, $\zeta$ is a saturation parameter defined as the ratio of linear density of ionized atoms to $\tau$, h is Planck's constant and c is the speed of light.

4. The method as defined in claim 3, said determining step further includes the step of determining an actual average inversion level over time $N_2(t)$ in accordance with the following formula:

$$\frac{dN_2}{dt} + \frac{1}{\tau}N_2 \approx K\lambda_p[P_p^{in} - P_p^{out}] - K[\lambda_m(P_{tot}^{out} - P_{in}^{tot}) + \Delta Pin]$$

and wherein said power output $P_p^m$ of the pump light is adjusted to bring $N_{2(t)}$ equal to $N_{2ref}$.

5. The method as defined in claim 3, wherein the power output of the pump light $P_p^m$ is adjusted in accordance with the following formula to maintain an actual steady state average inversion level $N_{2ss}$ equal to $N_{2ref}$:

$$P_p^{in} = P_p^{out} + \frac{1}{\tau K \lambda_p} \cdot N_{2ref} + \frac{\lambda_m}{\lambda_p} \cdot (P_{tot}^{out} - P_{in}^{tot}) + \frac{1}{\lambda_p} \cdot \Delta Pin.$$

6. The method as defined in claim 1, wherein said selection of said set point average inversion level is determined by a lookup table that correlates a gain set point with an average inversion level set point.

7. The method of controlling a multi-channel optical amplifier according to claim 1, wherein said dopant is a rare earth metal.

8. The method of controlling a multi-channel optical amplifier according to claim 6, wherein said dopant is erbium.

9. The method of controlling a multi-channel optical amplifier according to claim 2, further including the step of selecting said reference wavelength $\lambda_m$ such that an estimation error is minimized.

10. The method of controlling a multi-channel optical amplifier according to claim 1, wherein said determining and adjusting steps are substantially continuous.

11. The method of controlling a multi-channel optical amplifier according to claim 1, wherein said power adjusting step is implemented by modulating a transmission of electrical power to said pump light source.

12. The method of controlling a multi-channel optical amplifier according to claim 1, wherein said power adjusting step is implemented by modulating the optical output of said pump light source with a variable optical attenuator.

13. The method as defined in claim 1, further including the step of determining linear gain per channel of optical input from said total optical input power $$P_{in}^{tot}$$

and output power $$P_{tot}^{out},$$

pump light power output $P_p^m$ and remnant power $$P_p^{out}.$$

14. The method as defined in claim 13, further including the step of equalizing said linear gain per channel.

15. The method as defined in claim 14, wherein said equalization of linear gain is implemented by a dynamic gain flattening filter.

16. The method as defined in claim 13, wherein linear gain per channel is determined by first computing the average inversion level over time $N_2(t)$, and then determining linear gain for each channel i=1, 2, . . . in accordance with:

$$\ln\frac{P_i^{out}(t)}{P_i^{in}(t)} = [(\alpha_i + \gamma_i)N_2(t) - \alpha_i]\, L, \, i = 1, 2 \ldots n_s$$

where L is the length of the gain fiber, $\alpha_i$ is a channel absorption constant for a specified gain fiber, and $\gamma_i$ is a channel constant for the gain fiber.

17. The method as defined in claim 16, further including the step of correcting the value of the average inversion level $N_2(t)$ in accordance with an estimation error factor $\epsilon$.

18. The method as defined in claim 1, wherein said power output $P_p^m$ of the pump light is continously adjusted during an addition or subtraction of channels transmitted through said amplifier.

19. A control system for a multi-channel optical amplifier having a gain fiber containing dopant atoms excitable to an inverted quantum level, and a source of pump light coupled to said fiber, comprising:

a control circuit that maintains a set point average inversion level $N_{2ref}$ of said dopant atoms that corresponds to a desired amplifier gain level by controlling a power output of said pump light in response to total amplifier optical input power $$P_{in}^{tot}$$

and output power $$P_{tot}^{out},$$

and pump light remnant power $$P_p^{out}.$$

20. The control system for a multi-channel optical amplifier according to claim 19, wherein said control circuit maintains $N_{2ref}$ in response to said power parameters $$P_{tot}^{out}, P_{in}^{tot}, \text{and } P_p^{out}.$$

21. The control system for a multi-channel optical amplifier according to claim 19, wherein said control circuit maintains $P_p^m$ only in response to said power parameters $$P_{tot}^{out}, P_{in}^{tot}, P_p^{out}$$

and the actual power output $P_p^m$ of the source of pump light.

22. The control system for a multi-channel optical amplifier according to claim 19, further including first, second, and third monitoring circuits connected to an end of said gain fiber for generating signals indicative of $$P_{in}^{tot}, P_{tot}^{out}, \text{and } P_p^{out},$$

respectively.

23. The control system for a multi-channel optical amplifier according to claim 22, wherein the pump light is powered by a source of electrical current, and further including a circuit for generating a signal indicative of actual power output $P_p^m$ of said pump light on a basis of an amount of current conducted to said pump light from said current source.

24. The control system for a multi-channel optical amplifier according to claim 22, further including a fourth monitoring circuit connected to said fiber downstream of said pump light for generating a signal indicative of actual power output $P_p^m$ of said pump light.

25. The control system for a multi-channel optical amplifier according to claim 24, wherein each of said monitoring circuits includes an optical tap coupled to an end of said gain fiber, and a photosensitive component that converts light from said tap to an electrical signal.

26. The control system for a multi-channel optical amplifier according to claim 25, wherein each of said monitoring circuits further includes an amplifier that amplifies said electrical signal from said photosensitive component.

27. The control system for a multi-channel optical amplifier according to claim 20, wherein said control circuit includes a digital processor that determines a signal indicative of said pump light power $P_p^m$ necessary to achieve $N_{2ref}$ in accordance with said three power parameters $$P_{in}^{tot}, P_{tot}^{out}, \text{ and } P_p^{out},$$

and the wavelength of the pump light $\lambda_p$ and a reference wavelength $\lambda_m$ of one of the channels of the amplifier and a spontaneous lifetime $\tau$ of said atoms at said inverted quantum level.

28. The control system for a multi-channel optical amplifier according to claim 27, wherein said digital processor computes the value of pump light power output $P_p^m$ necessary to achieve said $N_{2ref}$ in accordance with $$P_p^{in} = P_p^{out} + \frac{1}{\tau K \lambda_p} \cdot N_{2ref} + \frac{\lambda_m}{\lambda_p} \cdot (P_{tot}^{out} - P_{in}^{tot}) + \frac{1}{\lambda_p} \cdot \Delta Pin$$

wherein K equals $$\frac{1}{\tau L \zeta hc}$$

and L is the length of the gain fiber, $\zeta$ is a saturation parameter defined as the ratio of linear density of ionized atoms to $\tau$, h is Planck's constant and c is the speed of light.

29. The control system for a multi-channel optical amplifier according to claim 21, wherein said control circuit includes an $N_2$ estimator circuit that computes an actual inversion $N_{2(t)}$ in accordance with $$\frac{dN_2}{dt} + \frac{1}{\tau}N_2 \approx K\lambda_p[P_p^{in} - P_p^{out}] - K[\lambda_m(P_{tot}^{out} - P_{in}^{tot}) + \Delta Pin]$$

wherein $\lambda_p$ is the wavelength of the pump light, $\lambda m$ is a reference wavelength of one of the channels of the amplifier, $\tau$ is a spontaneous lifetime of ionized dopant atoms at said inverted quantum level, and K equals $$\frac{1}{\tau L \zeta hc}$$

where L is the length of the gain fiber, $\zeta$ is a saturation parameter defined as the ratio of linear density of ionized atoms to $\tau$, h is Planck's constant and c is the speed of light.

30. The control system for a multi-channel optical amplifier according to claim 29, wherein said control circuit further includes an adjustment circuit that adjusts the value of $P_p^m$ until $N_2(t)$ is equal to $N_{2ref}$.

31. The control system for a multi-channel optical amplifier according to claim 21, further including a circuit that estimates a gain level of channels amplified by the amplifier.

32. The control system for a multi-channel optical amplifier according to claim 31, wherein said gain level circuit includes a digital processor that computes a linear gain level for a channel on the basis of an average inversion level $N_2(t)$ calculated from total optical input power $$P_{in}^{tot}$$

and output power $$P_{tot}^{out},$$

pump light power output $P_p^m$ and remnant power $$P_p^{out}.$$

33. The control system for a multi-channel optical amplifier according to claim 32, wherein said digital processor further computes a linear gain level for each channel i=1, 2, . . . in accordance with $$\ln\frac{P_i^{out}(t)}{P_i^{in}(t)} = [(\alpha_i + \gamma_i)N_2(t) - \alpha_i]L, \, i = 1, 2 \ldots n_s$$

where $$P_i^{in}(t) \text{ and } P_i^{out}(t)$$

are the input and output power of a channel i, L is the length of the gain fiber, $\alpha_1$ is a channel absorption constant for a specified gain, and $\gamma_1$ is a channel constant for the gain fiber.

34. The control system for a multi-channel optical amplifier according to claim 33, wherein said digital processor corrects the value of the average inversion level $N_2(t)$ in accordance with an estimation factor $\epsilon$.

35. The control system for a multi-channel optical amplifier according to claim 19, wherein said digital processor wherein said control circuit converts said desired amplifier gain level to a set point average inversion level by means of a predetermined correlation between gain level and average inversion level.

36. The control system for a multi-channel optical amplifier according to claim 33, further comprising a dynamic gain flattening filter that equalizes gain between said channels.

37. A method for controlling the gain of a multi-channel optical amplifier of the type having a gain fiber containing dopant atoms excitable to an inverted quantum level by a source of pump light, wherein said amplifier has a maximum channel capacity of ten channels, comprising the steps of:

selecting a set point average inversion level $N_{2ref}$ of said dopant atoms that corresponds to a desired amplifier gain level;

determining a pump light power output $P_p^m$ necessary to achieve said $N_{2ref}$ from total amplifier optical input power $$P_{in}^{tot}$$

and output power $$P_{tot}^{out},$$

and pump light remnant power $$P_p^{out},$$

and adjusting the power output $P_p^m$ of the pump light to achieve and maintain said set point $N_{2ref}$ inversion level.

38. A control system particularly adapted for a multi-channel optical amplifier having a maximum channel capacity of ten channels, a gain fiber containing dopant atoms excitable to an inverted quantum level, and a source of pump light coupled to said fiber, comprising:

a control circuit that maintains a set point average inversion level $N_{2ref}$ of said dopant atoms that corresponds to a desired amplifier gain level by controlling a power output of said pump light in response to total amplifier optical input power $$P_{in}^{tot}$$

and output power $$P_{tot}^{out},$$

and pump light remnant power $$P_p^{out}.$$

39. A method for controlling a multi-channel optical amplifier of the type having at least one gain stage with gain fiber containing dopant atoms excitable to an inverted quantum level by a source of pump-light, comprising the steps of:

selecting a set point average inversion level $N_{2ref}$ of said dopant atoms that corresponds to a desired amplifier gain level;

determining a pump light power output $$P_p^{in}$$

necessary to achieve said $N_{2ref}$ from total amplifier optical input power $$P_{in}^{tot}$$

and output power $$P_{tot}^{out},$$

and adjusting the power output $$P_p^{in}$$

of the pump light to achieve and maintain said set point $N_{2ref}$ inversion level.

40. A method according to claim 39 wherein said amplifier is a single stage amplifier.

41. A control system particularly adapted for a multi-channel optical amplifier having a maximum channel capacity of ten channels, at least one gain stage with a gain fiber containing dopant atoms excitable to an inverted quantum level, and a source of pump light coupled to said fiber, comprising:

a control circuit that maintains a set point average inversion level $N_{2ref}$ of said dopant atoms that corresponds to a desired amplifier gain level by controlling a power output of said pump light in response to total amplifier optical input power $$P_{in}^{tot}$$

and output power $$P_{tot}^{out}.$$

42. A control system according to claim 41, wherein said amplifier is a single stage amplifier.

* * * * *